(12) United States Patent
Fenayon et al.

(10) Patent No.: US 10,604,167 B2
(45) Date of Patent: Mar. 31, 2020

(54) AXLEBOX FOR A RAILWAY VEHICLE BOGIE AND RAILWAY BOGIE EQUIPPED WITH SUCH AN AXLEBOX

(71) Applicant: Aktiebolaget SKF, Gothenburg (SE)

(72) Inventors: Ludovic Fenayon, Montbazon (FR); Thierry Le Moigne, Luynes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 293 days.

(21) Appl. No.: 15/840,472

(22) Filed: Dec. 13, 2017

(65) Prior Publication Data

US 2018/0170409 A1   Jun. 21, 2018

(30) Foreign Application Priority Data

Dec. 16, 2016 (DE) .......... 10 2016 225 215

(51) Int. Cl.
   *B61F 15/12* (2006.01)
   *B61F 15/22* (2006.01)
   *B61F 15/26* (2006.01)

(52) U.S. Cl.
   CPC ............ *B61F 15/12* (2013.01); *B61F 15/22* (2013.01); *B61F 15/26* (2013.01)

(58) Field of Classification Search
   CPC .................................. B61F 15/00–28
   See application file for complete search history.

(56) References Cited

U.S. PATENT DOCUMENTS

| | | | | |
|---|---|---|---|---|
| 5,462,367 A | * | 10/1995 | Davidson | B61F 15/12 384/459 |
| 5,651,617 A | * | 7/1997 | Danielsson | B60B 27/001 384/539 |
| 6,203,206 B1 | * | 3/2001 | Dagh | F16C 33/60 384/477 |
| 7,121,728 B2 | * | 10/2006 | Pete | F16C 19/386 384/477 |
| 2003/0094849 A1 | * | 5/2003 | Joki | B60B 27/001 301/105.1 |
| 2013/0011090 A1 | * | 1/2013 | Shimizu | F16C 33/80 384/480 |
| 2014/0093199 A1 | * | 4/2014 | Fujiwara | B61F 15/12 384/448 |
| 2016/0039434 A1 | * | 2/2016 | Van Der Ham | B61F 15/20 301/108.1 |
| 2016/0355196 A1 | * | 12/2016 | Johansson | F16C 33/7813 |
| 2017/0137040 A1 | * | 5/2017 | Fenayon | B61F 5/26 |
| 2017/0217453 A1 | * | 8/2017 | Champalou | B61F 15/02 |
| 2018/0170409 A1 | * | 6/2018 | Fenayon | B61F 15/12 |
| 2018/0312177 A1 | * | 11/2018 | Marquardt | B61F 15/22 |
| 2018/0339717 A1 | * | 11/2018 | Champalou | B61F 15/26 |
| 2019/0195283 A1 | * | 6/2019 | Ueno | B61F 15/12 |

* cited by examiner

*Primary Examiner* — Jason C Smith
(74) *Attorney, Agent, or Firm* — Garcia-Zamor Intellectual Property Law, LLC; Ruy Garcia-Zamor; Bryan Peckjian

(57) ABSTRACT

An axlebox of railway vehicle bogie comprising a housing, a front cover fixed to a front side of the housing, a rear cover fixed to a rear side of the housing, a cylindrical roller bearing unit, an end cap and a backing ring. A rear chamber and a front chamber on both axial sides of the sealed bearing unit are in fluidic connection through a bypass system.

12 Claims, 6 Drawing Sheets

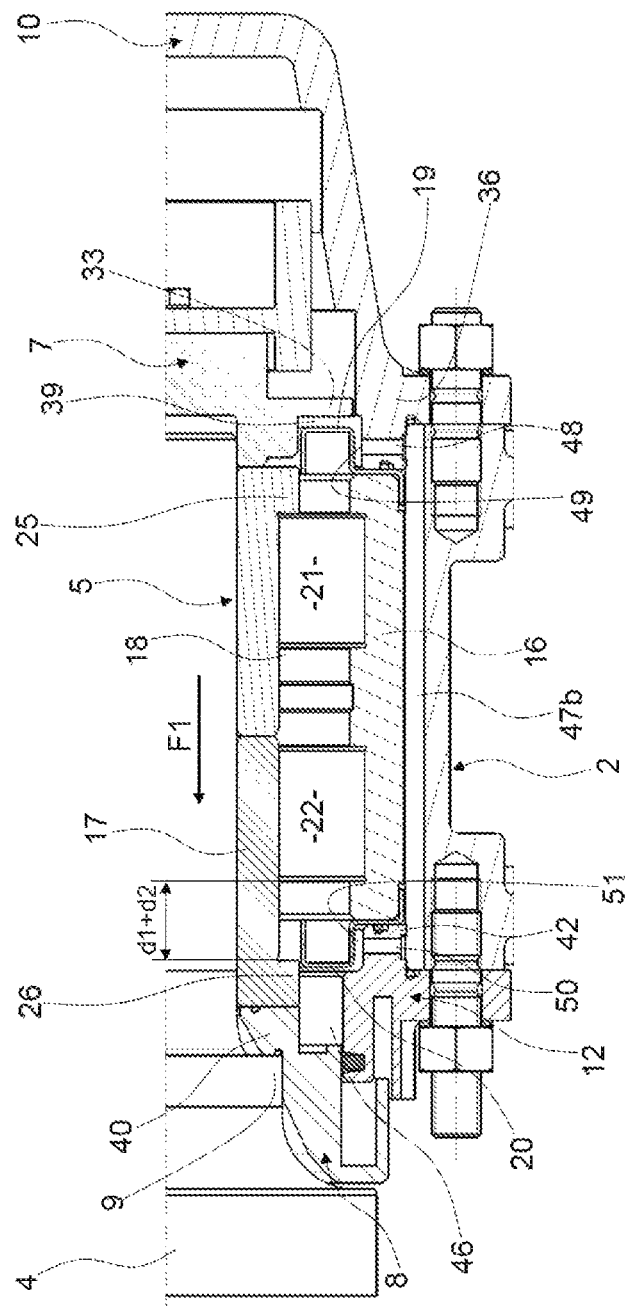

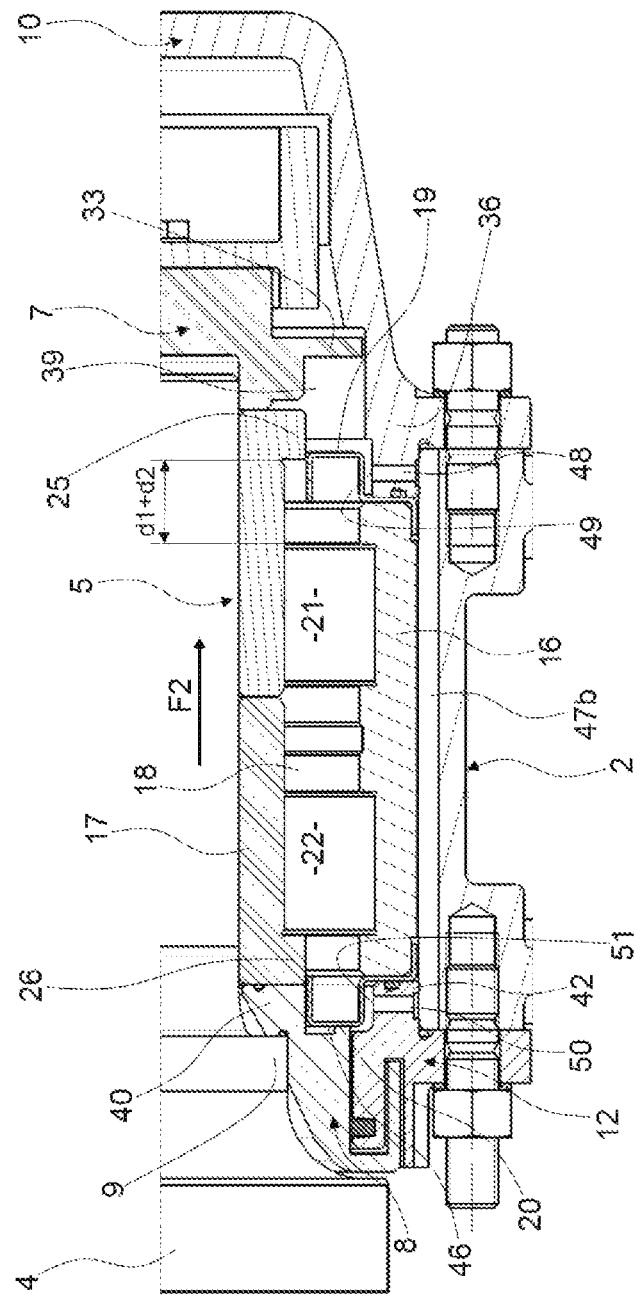

AXLEBOX FOR A RAILWAY VEHICLE BOGIE AND RAILWAY BOGIE EQUIPPED WITH SUCH AN AXLEBOX

CROSS-REFERENCE TO RELATED APPLICATIONS

This application claims priority to German patent application no. 102016225215.1 filed on Dec. 16, 2016, the contents of which are fully incorporated herein by reference.

FIELD OF THE PRESENT INVENTION

The present invention relates to an axlebox of a railway vehicle bogie, specially a 3-axle bogie design that requires a special lateral movement of the middle axle by running curved tracks. The invention also relates to a railway bogie equipped with such an axlebox.

BACKGROUND

Typically, 3- or more-axle railway bogie designs are provided with at least three rotatable axles, wheels being mounted on axial ends of the axles. Each axle end is supported in rotation by an associated axlebox. Axleboxes are provided with suspension arrangement for the bogie. At least one of the axles forms a middle axle for the bogie designs.

When a 3-axle railway bogie runs a curved track, the middle axle requires an axial displacement with respect to the other two axles that are positioned in the same lateral plan in a curve. Such an axial displacement is possible thanks to axleboxes for the middle axle provided each with special bearing system with axial floating capability.

It is known to provide the axleboxes supporting the middle axle with cylindrical roller bearing units with an axial displacement capability for the rollers. Such bearing units typically comprise a stationary outer ring fixed to an axlebox housing, the housing being fixed to the bogie, a rotating inner ring fixed to the axle, and cylindrical rollers radially housed between the inner and outer rings. A raceway for the rollers is defined in an annular groove provided in the cylindrical bore of the outer ring, the rollers being axially blocked within the groove steps with no possibility to axial move. A raceway for the rollers is defined in an outer cylindrical surface of the inner ring between two steps but, on the contrary to the outer ring, the axial length between the two steps is larger than the axial length of rollers so as to define a running gap. The rollers can axially slide between the two steps of the rotating inner ring and then permits a relative axial displacement between the middle axle and the axlebox housing, hence the bogie.

Typically, the radial space between the inner and outer rings of cylindrical roller bearing units is closed by a sealing arrangement so as to define a rolling chamber for the rollers. The sealing arrangement can consist in shields fixed to the stationary outer ring or housing and forming a labyrinth seal with the rotating inner ring. The sealing arrangement may comprise sealing gaskets made of polymer material and provided with sliding lip. The sealing arrangement prevents any entry of dust, metal particles and water in the rolling chamber. The rolling chamber of cylindrical roller bearing units is provided with lubricant, in particular grease to ensure the lubrication of the rolling and sliding contact between the rollers and the raceways of the inner and outer rings. The sealing arrangement also permits to maintain the lubricant within the rolling chamber.

However, the relative axial displacement between the stationary outer ring and the rotating inner ring induces a grease displacement in the rolling chamber. More precisely, the axial displacement of grease in a closed chamber generates a pumping effect and tends to expel the grease out of the rolling chamber. The sealing arrangement blocks only partly the grease but an important grease leakage out of the bearing unit is generated, degrading the bearing performance and reducing the bearing lifetime.

BRIEF SUMMARY OF THE PRESENT INVENTION

The aim of the invention is to resolve these drawbacks by proposing a new axlebox with axial floating capability that prevents grease leakage, provides a longer lifetime with high performance, and is economic and easy to manufacture.

To this end, the invention relates to an axlebox of railway vehicle bogie comprising a housing, a front cover fixed to a front side of the housing, a rear cover fixed to a rear side of the housing, a cylindrical roller bearing unit, an end cap and a backing ring.

The cylindrical roller bearing unit has a stationary outer ring mounted in a bore of the housing of the axlebox, a rotating inner ring dedicated to be fixed to an axial end of a rotating bogie axle, an annular rolling chamber radially defined between the inner ring and the outer ring, the rolling chamber being axially closed by the sealing arrangement, and at least one row of cylindrical rollers mounted in the rolling chamber radially between the inner ring and the outer ring and axially between a front sealing arrangement and a rear sealing arrangement, the inner ring comprising two steps able to axially block the rollers, such as the axial length between the two steps is larger than the rollers axial length to allow relative axial displacement of the rollers with respect to the inner ring.

The end cap has a central portion traversed by screw bores and adapted to be secured by screw bolts to a front surface of the axial end of the rotating bogie axle, and a radial flange radially outwardly extending from the central portion and defined to axially contact a front end of the inner ring of the bearing unit.

The backing ring is annular and axially mounted between a step of the bogie axle and a rear end of the inner ring of the bearing unit.

The front cover comprises a cover portion with an annular axial flange defined to axially contact a front end of the outer ring of the bearing unit, the axial flange being mounted in the bore of the housing.

The rear cover comprises an annular axial flange defined to axially contact a rear end of the outer ring of the bearing unit, the axial flange being mounted in the bore of the housing.

An annular front chamber is defined between the bearing unit, and more particularly the front sealing arrangement, a portion of the radial flange of the end cap, and the axial flange of the front cover, the front chamber being able to receive a portion of the bearing unit, and more particularly the front sealing arrangement, in case of relative axial displacement between the housing and the bogie axle in a first axial direction. An annular rear chamber is defined between the bearing unit, and more particularly the rear sealing arrangement, a radial portion of the backing ring, and the axial flange of the rear cover, the rear chamber being able to receive a portion of the bearing unit, and more particularly the rear sealing arrangement, in case of relative axial displacement between the housing and the bogie axle in a second axial direction.

According to the invention, the housing comprises at least one through channel with a first opening in the bore of housing beyond a front end of the outer ring and a second opening in the bore of housing beyond a rear end of the outer ring. The axial flange of the front cover comprises at least one radial through hole. The axial flange of the rear cover comprises at least one radial through hole. The rear chamber and the front chamber are in fluidic connection through the at least one radial through hole of the rear cover, the at least one channel of the housing, and the at least one radial through hole of the front cover.

Thanks to the invention, the two chambers on both sides of the bearing unit are in fluidic connection by a bypass arrangement formed by the radial holes of the covers and the channel through the housing.

A relative axial displacement between the axle and the bogie generates an overpressure in one of the chambers, and a depression in the other chamber. The pressures are then equilibrated between the rear and front chambers so as to prevent the pumping effect. The grease in the closed rolling chamber of the bearing unit is not affected by any pumping effect and grease leakage out of the bearing unit is prevented.

The bypass system is provided out of the bearing unit, and within the axlebox. The cylindrical roller bearing unit is intrinsically sealed and does not require any change with the present invention. A standardized cylindrical roller bearing unit with axial floating capability can be used. The axlebox does not require any additional component but only specific design amendments with channels easy to manufacture.

According to further aspects of the invention which are advantageous but not compulsory, such a mechanical system may incorporate one or several of the following features:

The cylindrical roller bearing unit comprises two rows of rollers that are axially adjacent.

The rollers are circumferentially equally spaced by a cage.

The sealing arrangement of the cylindrical roller bearing unit includes shields fixed to the outer ring and forming a labyrinth seal with the inner ring.

The at least one channel through the housing of the axlebox consists in at least one axial groove in the bore of the housing that axially extends along the outer ring, beyond a front end of the outer ring and beyond a rear end of the outer ring.

The at least one axial groove provided to the housing extends along the whole axial length of the bore of the housing.

The at least one axial groove is provided out of the loaded zone on the bearing unit.

The axial flange of the front cover comprises an outer cylindrical surface provided with an annular groove, the at least one radial through hole being open to the annular groove.

The axial flange of the rear cover comprises an outer cylindrical surface provided with an annular groove, the at least one radial through hole being open to the annular groove.

The axial flange of the front cover comprises a plurality of radial through holes that are circumferentially equally spaced.

The axial flange of the rear cover comprises a plurality of radial through holes that are circumferentially equally spaced.

The front cover comprises a radial flange radially outwardly extending from the axial flange, traversed by screw bores and adapted to be secured by screw bolts to a front surface of the housing.

The rear cover comprises a radial flange radially outwardly extending from the axial flange, traversed by screw bores and adapted to be secured by screw bolts to a rear surface of the housing.

The backing ring includes the sealing arrangement with the rear cover.

Another object of the invention is a railway bogie comprising a bogie frame, a wheel set having rotatable bogie axles and at least one axlebox as described here-above and supporting in rotation an axial end of at least one of the bogie axles, and at least one suspension mounted between each of the axleboxes with the bogie frame.

BRIEF DESCRIPTION OF THE DRAWINGS

The invention will now be explained in correspondence with the annexed figures, as illustrative examples, without restricting the object of the invention. In the annexed figures:

FIGS. 3a, 3b and 3c are detailed views of the axlebox of FIG. 2 in three positions;

DETAILED DESCRIPTION OF THE PRESENT INVENTION

Figure 1:
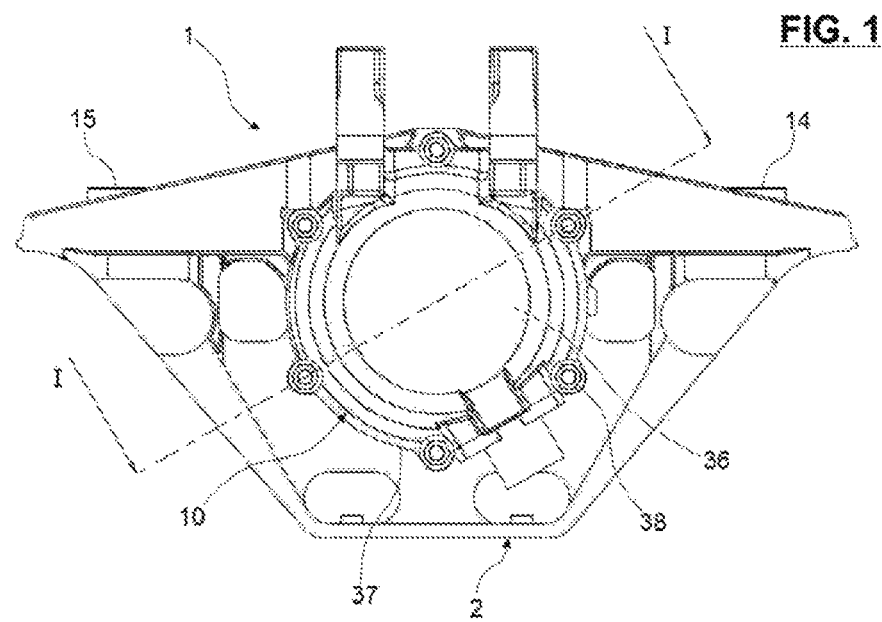
FIG. 1 is a front view of an axlebox.
Figure 2:
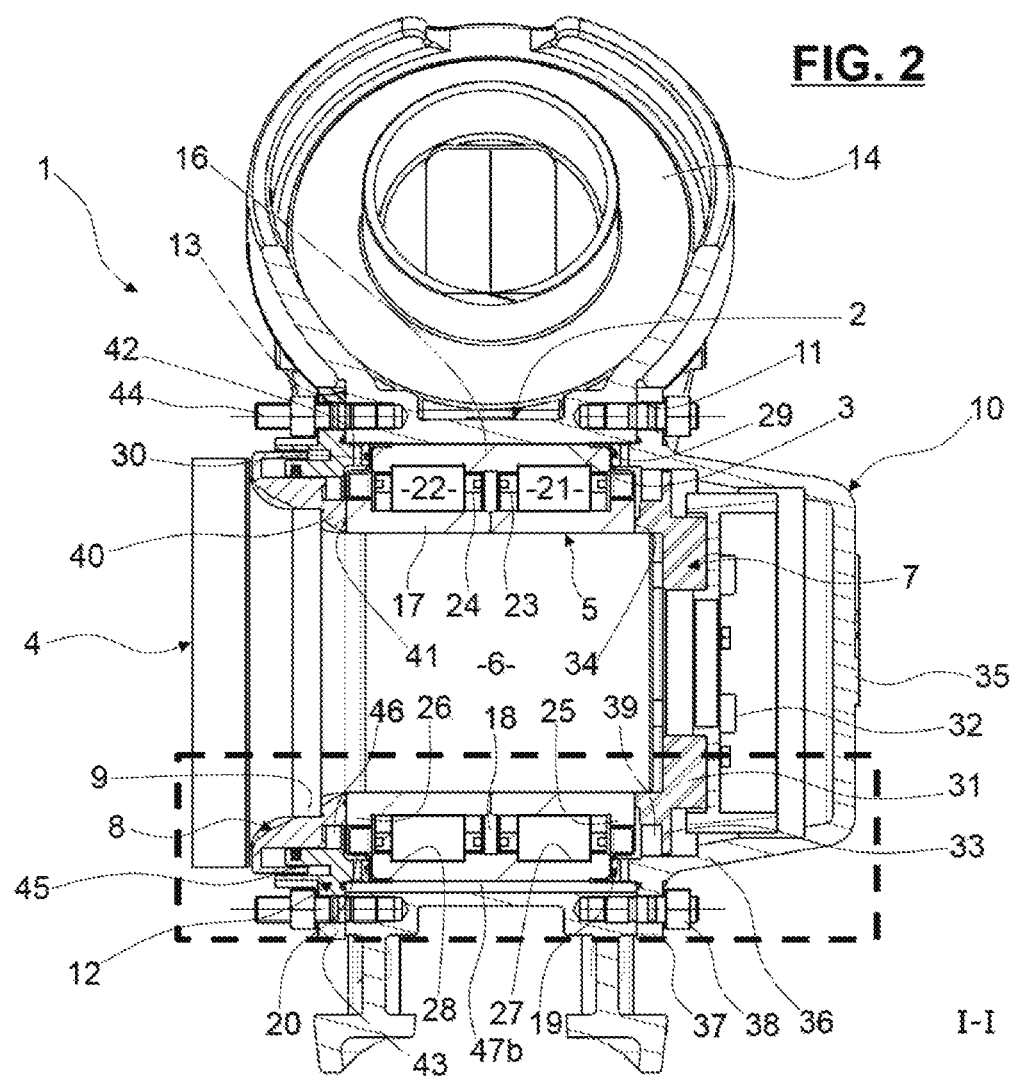
FIG. 2 is a cross-sectional view along line I-I of the axlebox of FIG. 1.
Figure 3A:
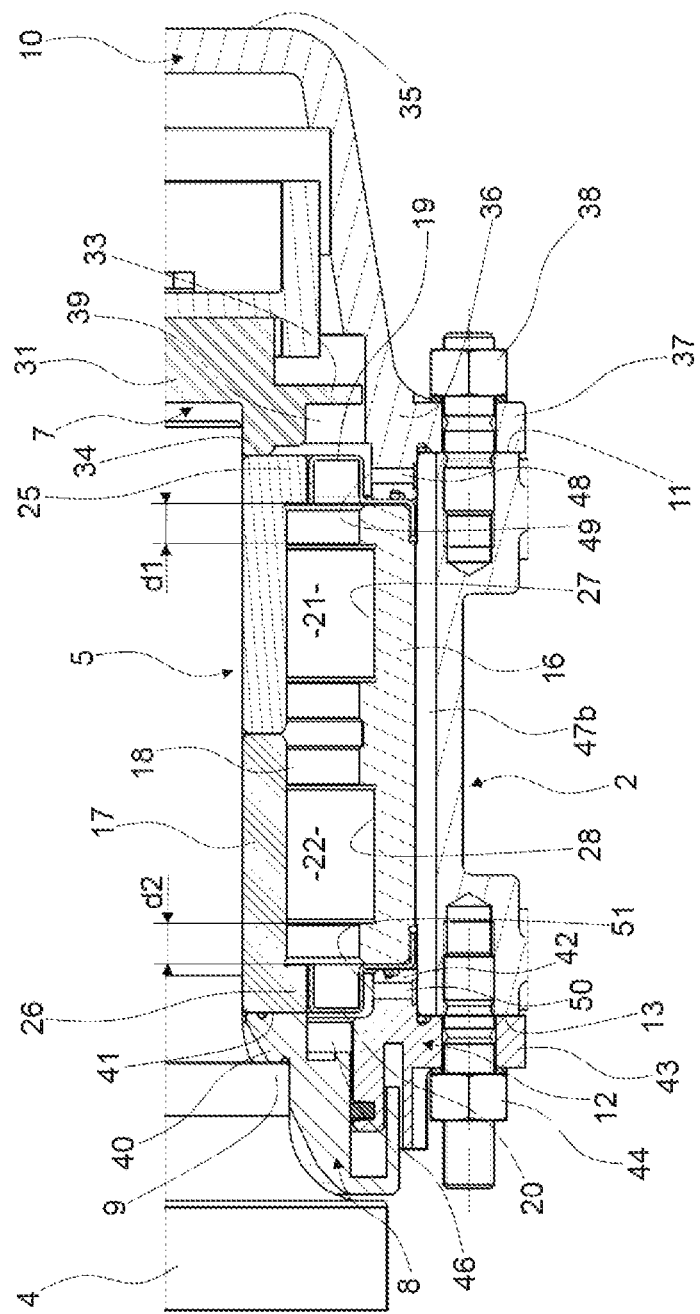
Figure 4:
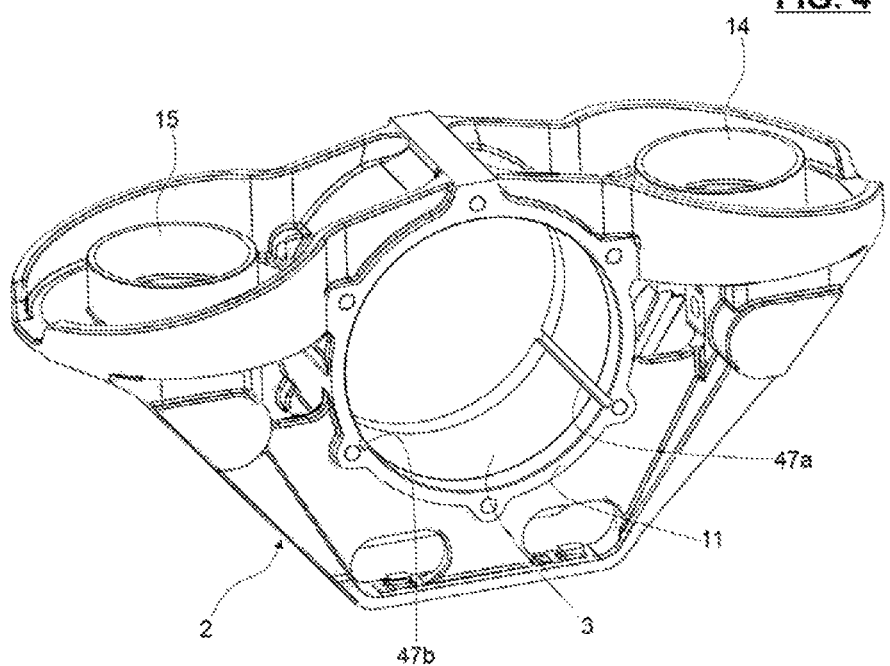
FIG. 4 is a perspective view on a housing of the axlebox of FIG. 2.
Figure 5:
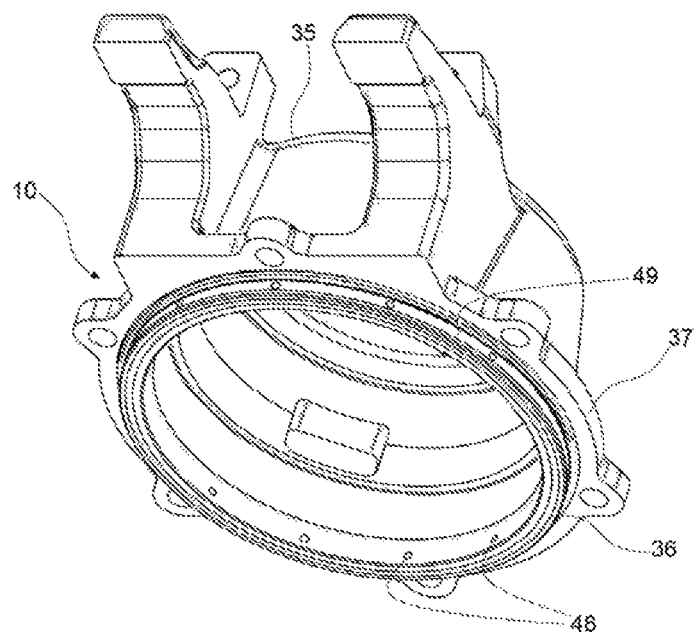
FIG. 5 is a perspective view on a front cover the axlebox of FIG. 2.
Figure 6:
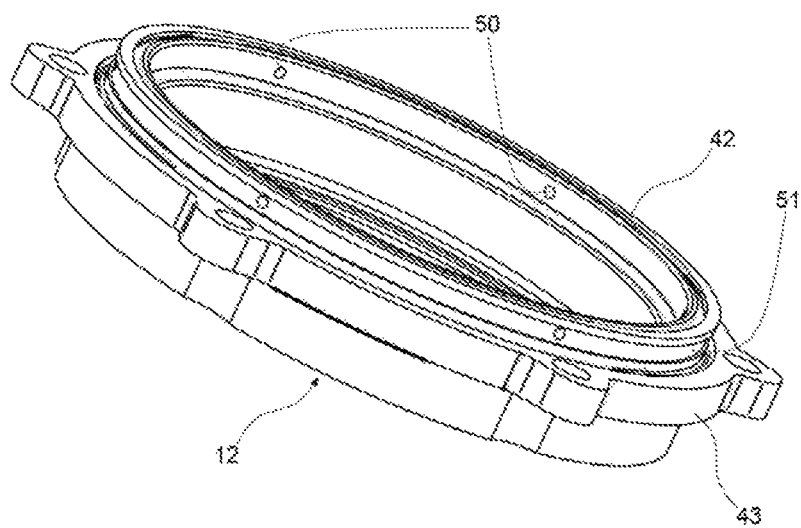
FIG. 6 is a perspective view on a rear cover of the axlebox of FIG. 2.

FIGS. 1, 2 and 3a represent an axlebox 1 comprising a housing 2 with a central bore 3 defining an axial passage for an axle 4, a cylindrical roller bearing unit 5 inserted in the bore 3 and supporting in rotation an axial end 6 of the axle 4. An end cap 7 is screwed on the axial end 6 of axle 4. A backing ring 8 is axially interposed between a step 9 of the axle 4 and the bearing unit 5. A front cover 10 is screwed on a front surface 11 of the housing 2. A rear cover 12 is screwed on a rear surface 13 of the housing 2.

In this embodiment and the following ones, the terms "front" and "rear" are defined in relation with the position of the axlebox with respect to the railway bogie, a front portion being positioned on an axial end of the axlebox towards the outside of the railway bogie, and a rear portion being positioned on an axial end of the axlebox towards the inside of the railway bogie.

The housing 2 further comprises spring supports 14, 15 dedicated to receive suspension arrangement, such as helicoidal springs (not shown), to support a non-illustrated bogie frame.

The cylindrical roller bearing unit 5 is mounted in the central bore 3 of housing 2. The bearing unit 5 comprises a stationary outer ring 16 press-fitted in the bore 3 of housing 2, a rotating inner ring 17 press-fitted on an outer cylindrical surface of the axial end 6 of axle 4, a rolling chamber 18 radially defined between an outer cylindrical surface of the inner ring 17, and an inner bore of the outer ring 16.

The front sealing arrangement 19 is oriented outwards from axle 4 and the rear sealing arrangement 20 is oriented towards the opposite end of the axle 4 are provided on both axial sides of the rolling chamber 18 so as to close the chamber 18.

The bearing unit 5 further comprises two rows of cylindrical rollers 21, 22 arranged in the rolling chamber 18, the rollers 21, 22 being circumferentially equally spaced by cages 23, 24, respectively. As an alternate embodiment, the cylindrical roller bearing unit 5 only comprises one row of cylindrical rollers.

The outer cylindrical surface of the inner ring 17 comprises two radial steps 25, 26 forming axial blocking features for the rollers 21, 22 respectively and defining two axial gaps of axial lengths d1 and d2 to permit the relative axial displacements of the rollers 21, 22 with respect to the inner ring 17. In the present embodiment, the inner ring is constituted of two separate ring elements that are axially adjacent.

The inner bore of the outer ring 16 comprises two annular grooves 27, 28 for the rows of rollers 21, 22 respectively. The axial length of each groove 27, 28 is substantially equal to the axial lengths of the rollers 21, 22 respectively, so as to prevent any relative axial displacement between the rollers 21, 22 and the outer ring 16. In the present embodiment, the outer ring is constituted of a single part. Alternatively, the inner ring is a single part and the outer ring is constituted of a plurality of ring elements placed side by side.

Thanks to such an arrangement of the cylindrical roller bearing unit 5, the axle 4, which is fixed to the inner ring 17, can have a relative axial displacement with respect to the housing 2, which is fixed to the outer ring 16 and fastened in axial displacement with the rollers 21, 22, along a first direction F1 as illustrated in FIG. 3b or a second direction F2 as illustrated in FIG. 3c.

The outer ring 16 is axially shorter than the inner ring 17. The front sealing arrangement 19 are formed by a shield attached to a front end 29 of the outer ring 16 and define a labyrinth seal with the outer cylindrical surface of the inner ring 17. On the other side, the rear sealing arrangement 20 are also formed by a shield attached to a rear end 30 of the outer ring 16 and define a labyrinth seal with the outer cylindrical surface of the inner ring 17. As an alternate not shown, the sealing arrangement may comprises sealing gaskets made of polymer and comprising sealing lips in sliding contact with the inner ring 17.

Advantageously, the rolling chamber 18 is provided with lubricant, for example grease, to increase bearing performance and to increase bearing lifetime.

The end cap 7 comprises a central portion 31 provided with bores in which are inserted screw bolts 32 screwed in a front surface of the axial end 6 of axle 4. The end cap further comprises an annular radial flange 33 extending radially outwardly from the central portion 31. The radial flange 33 is axially abutting against a front end 34 of the inner ring 17 so as to axially block the inner ring in one direction. The radial flange 33 further comprises an annular cylindrical surface that is radially aligned with the outer cylindrical surface of the inner ring 17.

The front cover 10 comprises a cover portion 35 extended by an annular axial flange 36 mounted in the bore 3 of axlebox housing 2. The axial flange 36 is axially abutting against the front end 29 of the outer ring 16 so as to axially block the outer ring in one direction. The axial flange 36 is further extended radially outwardly by a radial flange 37 provided with bores in which are inserted screw bolts 38 screwed in a front surface 11 of the housing 2.

The axial flange 36 of the front cover 10, the radial flange 33 of the end cap 7 and the front sealing arrangement 19 of the bearing unit 5 define a front chamber 39 able to receive the front sealing arrangement 19 during an axial displacement of the axle 4 with respect to the housing 2 along a direction F1 as illustrated in FIG. 3b.

The axle end 6 is of smaller diameter than the rest of the axle 4 so as to define the step 9. The backing ring 8 comprises an annular body 40 adapted to the corner of curved shape formed by the step 9 of the axle 4 and in axial abutment with a rear end 41 of the inner ring 17. The annular body 40 of backing ring 8 comprises an outer cylindrical surface that is aligned with the outer cylindrical surface of the inner ring 17.

The rear cover 12 comprises an annular axial flange 42 mounted in the bore 3 of the housing 2. The axial flange 42 is axially abutting against the rear end 30 of the outer ring 16 so as to axially block the outer ring in one direction. The axial flange 42 is further extended radially outwardly by a radial flange 43 provided with bores. Screw bolts 44 are inserted through the bores and screwed in the rear surface 13 of the housing 2.

The rear cover 12 and the backing ring 8 are provided with a sealing arrangement 45. In the present embodiment, the rear cover 12 and the backing ring 8 are provided with cooperating labyrinth shapes to form a labyrinth seal, and provided with a sliding sealing ring.

The axial flange 42 of the rear cover 12, the body 40 of the backing ring 8 and the rear sealing arrangement 20 of the bearing unit 5 define a rear chamber 46 able to receive the rear sealing arrangement 20 during an axial displacement of the axle 4 with respect to the housing 2 along a direction F2 as illustrated in FIG. 3c.

According to the invention, the bore 3 of the axlebox housing 2 is provided with two axial grooves 47a, 47b that axially extend along the outer ring 16 of bearing unit 5.

The grooves 47a, 47b extend axially along the whole axial length of the bore 3. Alternatively, grooves may extend only along a limited length of the bore, but being provided with ends axially beyond the front end 34 and the rear end 41 of the outer ring.

Alternatively, the axlebox housing 2 is provided with a through channel, the channel being provided with openings in the bore 3 of axlebox housing 2, the openings being provided axially beyond the front end 34 and the rear end 41 of the outer ring.

Axial grooves 47a, 47b are provided out of the loaded zone on the bearing unit 5 so as to prevent any failure of the housing 2.

According to another aspect of the present invention, a plurality of radial through holes 48 is provided to the portion of the axial flange 36 of front cover 10 that is arranged in the bore 3 of axlebox housing 2. The holes 48 are arranged in the bore 3 of axlebox housing 2.

According to an advantageous aspect of the present invention, the outer cylindrical surface of the flange 36 of front cover 10 is also provided with an annular groove 49, the radial through holes 48 being open outwards in the annular groove 49.

The holes 48 are outwardly open in fluidic connection with a front side of the axial grooves 47a, 47b provided in the bore 3 of axlebox housing 2 by arrangement of the annular groove 49. The relative positions of the axial grooves 47a, 47b of housing 2 and the radial through holes 48 of the front cover 10 can be independently defined. The annular groove 49 of the front cover 10 guarantees the fluidic connection between the axial grooves 47a, 47b of housing 2 and radial through holes 48 of the front cover 10.

The holes 48 are inwardly open in fluidic connection with the front chamber 39 defined on a front side and out of the cylindrical roller bearing unit 5. The front chamber 39 and the axial grooves 47a, 47b of housing 2 are in fluidic connection through the annular groove 49 and radial through holes 48 of front cover 10.

Radial through holes 48 are circumferentially equally spaced on the annular axial flanges 36 so as to permit a homogeneous distribution of the pressure regulation.

Similarly, a plurality of radial through holes 50 is provided to the portion of the axial flange 42 of rear cover 12 that is arranged in the bore 3 of axlebox housing 2. The holes 50 are arranged in the bore 3 of axlebox housing 2.

The outer cylindrical surface of the flange 42 of rear cover 12 is also provided with an annular groove 51, the radial through holes 50 being open outwards in the annular groove 51.

The holes 50 are outwardly open in fluidic connection with a rear side of axial grooves 47a, 47b provided in the bore 3 of axlebox housing 2 by means of the annular groove 51. The relative positions of the axial grooves 47a, 47b of housing 2 and the radial through holes 50 of the rear cover 12 can be independently defined. The annular groove 51 of the rear cover 12 guarantees the fluidic connection between the axial grooves 47a, 47b of housing 2 and radial through holes 50 of the front cover 12.

Holes 50 are inwardly open in fluidic connection with the rear chamber 46 defined on a rear side and out of the cylindrical roller bearing unit 5. The rear chamber 46 and the axial grooves 47a, 47b of housing 2 are in fluidic connection through the annular groove 51 and radial through holes 50 of rear cover 12.

Radial through holes 50 are circumferentially equally spaced on the annular axial flanges 42 so as to permit a homogeneous distribution of the pressure regulation.

Thanks to such an arrangement, the rear chamber 46 and the front chamber 39 that are on both axial sides of the sealed bearing unit 5 are in fluidic connection by the radial through holes 50 of rear cover 12, the annular groove 51 of rear cover 12, the axial grooves 47a, 47b in the bore 3 of axlebox housing 2, the annular groove 49 of front cover 10 and the radial through holes 48 of front cover 10. It defines a bypass system wherein the pressure is equilibrated.

The axlebox 1 is dedicated to be mounted on a middle axle end of a 3- or multiple-axle railway bogie and works as follows.

When the railway bogie runs a straight track, the bogie axles are set in a same plan with no axial displacement. The cylindrical roller bearing unit 5 is in a normal position as illustrated in FIG. 3a.

When the railway bogie runs a curve on track, the middle axle 4 is axially offset with respect to the two others axles.

The housing 2 is fixed to the bogie frame. The front cover 10, the rear cover 12, the outer ring 16 and rollers 21, 22 of the cylindrical roller bearing unit 5 are fixed to the housing 2 and form as an assembly that is axially stationary. The inner ring 17 of the cylindrical roller bearing unit 5, the end cap 7 and the backing ring 8 are fixed to the axle 4 and form an assembly that is axially movable.

If the middle axle has a relative axial displacement along the direction F1 towards the rear side of the bogie, cylindrical roller bearing unit 5 is in a shifted position as illustrated in FIG. 3b.

By comparing the shifted position of FIG. 3b with the normal position of FIG. 3a, the assembly of the middle axle 4, the backing ring 8, the end cap 8 and the inner ring 17 of the bearing unit 5 has an axial displacement F1 towards the rear side of the bogie with respect to the assembly of the front cover 10, the rear cover 12, the outer ring 16 and rollers 21, 22 of the cylindrical roller bearing unit 5, and the housing 2.

More precisely, the rollers 21, 22 have axially slide on the outer cylindrical surface of the inner ring 17 until axial abutment of the front rollers 21 against the front step 25. The axial gap between the rear step 26 and the rear rollers 22 is equal to d1+d2 at maximum. The backing ring 8 has an axial displacement towards the rear side with respect to the rear cover 12. The end cap 7 has an axial displacement towards the rear side with respect to the front cover 10. The front sealing arrangement 19 of bearing unit 5 is fit in the front chamber 39 defined for this purpose.

With this relative axial movement, the volume of the front chamber 39 is decreased. An overpressure is generated in the front chamber 39. On the contrary, the volume of the rear chamber 46 is increased. A depression is generated in the rear chamber 46.

If the middle axle has a relative axial displacement along the direction F2 towards the front side of the bogie, cylindrical roller bearing unit 5 is in a shifted position as illustrated in FIG. 3c.

By comparing the shifted position of FIG. 3c with the normal position of FIG. 3a, the assembly of the middle axle 4, the backing ring 8, the end cap 8 and the inner ring 17 of the bearing unit 5 has an axial displacement F2 towards the front side of the bogie with respect to the assembly of the front cover 10, the rear cover 12, the outer ring 16 and rollers 21, 22 of the cylindrical roller bearing unit 5, and the housing 2.

More precisely, the rollers 21, 22 have axially slide on the outer cylindrical surface of the inner ring 17 until axial abutment of the rear rollers 22 against the rear step 26. The axial gap between the front step 25 and the front rollers 21 is equal to d1+d2 at maximum. The backing ring 8 has an axial displacement towards the front side with respect to the rear cover 12. The end cap 7 has an axial displacement towards the front side with respect to the front cover 10. The rear sealing arrangement 20 of bearing unit 5 is fit in the rear chamber 46 defined for this purpose.

With this relative axial movement, the volume of the front chamber 39 is increased. A depression is generated in the front chamber 39. On the contrary, the volume of the rear chamber 46 is decreased. An overpressure is generated in the rear chamber 46.

Thanks to the invention and in the both cases illustrated in FIGS. 3b and 3c, the rear and front chambers 46, 39 are in fluidic connection by a bypass system including the radial through holes 50 of rear cover 12, the annular groove 51 of rear cover 12, the axial grooves 47a, 47b in the bore 3 of axlebox housing 2, the annular groove 49 of front cover 10 and the radial through holes 48 of front cover 10. The overpressure of front chamber 39 is transmitted by the bypass system to the depressurized rear chamber 46. It permits to equilibrate the pressure in both chambers 39, 46 and bypass system. The so-called pumping effect between the rear and front sides of the sealed bearing unit 5 is prevented. Lubricant displacement in the sealed rolling chamber 18 of bearing unit 5 is not affected by any pumping effect, and then limits lubricant leakage out of the rear and front sealing arrangement 20, 19.

The embodiments disclosed in the description may be arranged or combined together and are still within the meaning of the present invention.

What is claimed is:

1. An axlebox of railway vehicle bogie comprising:
a housing;
a cylindrical roller bearing unit having a stationary outer ring mounted in a bore of the housing, a rotating inner ring dedicated to be fixed to an axial end of a rotating bogie axle, an annular rolling chamber radially defined between the inner ring and the outer ring, the rolling chamber being axially closed by sealing arrangement, and at least one row of cylindrical rollers mounted in the rolling chamber radially between the inner ring and the outer ring and axially between a front sealing arrangement and a rear sealing arrangement, the inner ring comprising two steps able to axially block the rollers, such as the axial length between the two steps is larger than the rollers axial length to allow relative axial displacement of the rollers with respect to the inner ring;
an end cap fixed to the rotating bogie axle and having a radial flange defined to axially contact a front end of the inner ring of the bearing unit;
an annular backing ring axially mounted between a step of the bogie axle and a rear end of the inner ring of the bearing unit;
a front cover fixed to a front side of the housing and comprising a cover portion with an annular axial flange defined to axially contact a front end of the outer ring of the bearing unit, the axial flange being mounted in the bore of the housing;
a rear cover fixed to a rear side of the housing and comprising an annular axial flange defined to axially contact a rear end of the outer ring of the bearing unit, the axial flange being mounted in the bore of the housing;
an annular front chamber defined between the bearing unit, a portion of the radial flange of the end cap, and the axial flange of the front cover, the front chamber being able to receive a portion of the bearing unit, in case of relative axial displacement between the bogie axle and the housing in a first axial direction;
an annular rear chamber defined between the bearing unit, a radial portion of the backing ring, and the axial flange of the rear cover, the rear chamber being able to receive a portion of the bearing unit, in case of relative axial displacement between the bogie axle and the housing in a second axial direction;
the housing comprises at least one through channel with a first opening in the bore of housing beyond a front end of the outer ring and a second opening in the bore of housing beyond a rear end of the outer ring;
at least one radial through hole extending through the axial flange of the front cover; and
at least one radial through hole extending through the axial flange of the rear cover,
wherein the rear chamber and the front chamber are in fluidic connection through the at least one radial through hole of the rear cover, the at least one channel of the housing, and the at least one radial through hole of the front cover.

2. The axlebox according to claim 1, wherein the annular rear chamber is defined between the rear sealing arrangement, the radial portion of the backing ring, and the axial flange of the rear cover, the rear chamber being able to receive the portion of the rear sealing arrangement, in case of relative axial displacement between the bogie axle and the housing in a second axial direction.

3. The axlebox according to claim 1, wherein the annular front chamber is defined between the front sealing arrangement, the portion of the radial flange of the end cap, and the axial flange of the front cover, the front chamber being able to receive a portion of the front sealing arrangement, in case of relative axial displacement between the bogie axle and the housing in a first axial direction.

4. The axlebox according to claim 1, wherein sealing arrangement of the cylindrical roller bearing unit are shields fixed to the outer ring and forming a labyrinth seal with the inner ring.

5. The axlebox according to claim 1, wherein the at least one channel through the housing of the axlebox consists in at least one axial groove in the bore of the housing that axially extends along the outer ring, beyond a front end of the outer ring and beyond a rear end of the outer ring.

6. The axlebox according to claim 5, wherein the at least one axial groove extends along the whole axial length of the bore of the housing.

7. The axlebox according to claim 5, wherein the at least one axial groove is provided out of the loaded zone on the bearing unit.

8. The axlebox according to claim 1, wherein the axial flange of the front cover comprises an outer cylindrical surface provided with an annular groove, the at least one radial through hole being open to the annular groove.

9. The axlebox according to claim 1, wherein the axial flange of the rear cover comprises an outer cylindrical surface provided with an annular groove, the at least one radial through hole being open to the annular groove.

10. The axlebox according to claim 1, wherein the axial flange of the front cover comprises a plurality of radial through holes that are circumferentially equally spaced.

11. The axlebox according to claim 1, wherein the axial flange of the rear cover comprises a plurality of radial through holes that are circumferentially equally spaced.

12. A Railway bogie comprising:
a bogie frame;
a wheel set having rotatable bogie axles; and
at least one axlebox, each axlebox comprising:
a housing;
a cylindrical roller bearing unit having a stationary outer ring mounted in a bore of the housing, a rotating inner ring dedicated to be fixed to an axial end of a rotating bogie axle, an annular rolling chamber radially defined between the inner ring and the outer ring, the rolling chamber being axially closed by sealing arrangement, and at least one row of cylindrical rollers mounted in the rolling chamber radially between the inner ring and the outer ring and axially between a front sealing arrangement and a rear sealing arrangement, the inner ring comprising two steps able to axially block the rollers, such as the axial length between the two steps is larger than the rollers axial length to allow relative axial displacement of the rollers with respect to the inner ring;
an end cap fixed to the rotating bogie axle and having a radial flange defined to axially contact a front end of the inner ring of the bearing unit,
an annular backing ring axially mounted between a step of the bogie axle and a rear end of the inner ring of the bearing unit;
a front cover fixed to a front side of the housing and comprising a cover portion with an annular axial flange defined to axially contact a front end of the outer ring of the bearing unit, the axial flange being mounted in the bore of the housing;

a rear cover fixed to a rear side of the housing and comprising an annular axial flange defined to axially contact a rear end of the outer ring of the bearing unit, the axial flange being mounted in the bore of the housing;

an annular front chamber defined between the bearing unit, a portion of the radial flange of the end cap, and the axial flange of the front cover, the front chamber being able to receive a portion of the bearing unit, in case of relative axial displacement between the bogie axle and the housing in a first axial direction;

an annular rear chamber defined between the bearing unit, a radial portion of the backing ring, and the axial flange of the rear cover, the rear chamber being able to receive a portion of the bearing unit, in case of relative axial displacement between the bogie axle and the housing in a second axial direction;

the housing comprises at least one through channel with a first opening in the bore of housing beyond a front end of the outer ring and a second opening in the bore of housing beyond a rear end of the outer ring;

at least one radial through hole extending through the axial flange of the front cover; and at least one radial through hole extending through the axial flange of the rear cover, wherein the rear chamber and the front chamber are in fluidic connection through the at least one radial through hole of the rear cover, the at least one channel of the housing, and the at least one radial through hole of the front cover, the at least one axlebox supporting, in rotation, an axial end of at least one of the bogie axles; and at least one suspension mounted between the axlebox and the bogie frame.

* * * * *